United States Patent
Blevis et al.

(10) Patent No.: US 10,809,396 B2
(45) Date of Patent: Oct. 20, 2020

(54) HIGH ENERGY RESOLUTION/HIGH X-RAY FLUX PHOTON COUNTING DETECTOR

(71) Applicant: KONINKLIJKE PHILIPS N.V., Eindhoven (NL)

(72) Inventors: Ira Micah Blevis, Zichron Yaakov (IL); Roger Steadman Booker, Aachen (DE); Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/742,625

(22) PCT Filed: Jul. 4, 2016

(86) PCT No.: PCT/IB2016/054001
§ 371 (c)(1),
(2) Date: Jan. 8, 2018

(87) PCT Pub. No.: WO2017/009736
PCT Pub. Date: Jan. 19, 2017

(65) Prior Publication Data
US 2018/0196149 A1    Jul. 12, 2018

Related U.S. Application Data

(60) Provisional application No. 62/191,547, filed on Jul. 13, 2015.

(51) Int. Cl.
*G01T 1/24*       (2006.01)
*G01T 7/00*       (2006.01)

(52) U.S. Cl.
CPC ............. *G01T 1/247* (2013.01); *G01T 1/243* (2013.01); *G01T 7/00* (2013.01)

(58) Field of Classification Search
CPC ............ G01T 1/247; G01T 1/243; G01T 1/00
(Continued)

(56) References Cited

U.S. PATENT DOCUMENTS 4,504,962 A    3/1985 Moore
4,747,117 A    5/1988 Albrecht
(Continued)

FOREIGN PATENT DOCUMENTS

EP    0981997    3/2000
EP    2589986    5/2013
(Continued)

OTHER PUBLICATIONS

Spieler, H., "Pulse Processing and Analysis", IEEE NPSS Short Course, Radiation Detection and Measurement, 1999 Nuclear Science Symposium (Year: 1999).*
(Continued)

*Primary Examiner* — Blake C Riddick
(74) *Attorney, Agent, or Firm* — Larry Liberchuk

(57) ABSTRACT

An imaging system (100) includes a detector module (114). The detector module includes a block (300) of a plurality of direct conversion photon counting detector pixels (122) and corresponding electronics (124, 604, 606, 132, 134 or 124, 128, 130, 134, 802) with hardware for both high energy resolution imaging mode and high X-ray flux imaging mode connected with the block of the plurality of direct conversion photon counting detector pixels. A method includes identifying a scanning mode for a selected imaging protocol, wherein the scanning modes includes one of a higher energy resolution mode and a higher X-ray flux mode, configuring a detector module, which is configurable for both the higher energy resolution mode and the higher X-ray flux mode, based on the identified scanning mode, performing the scan with the detector module configured for the mode of the (Continued)

selected imaging protocol, and processing scan data from the scan, generating volumetric image data.

23 Claims, 7 Drawing Sheets

(58) Field of Classification Search
USPC .......................... 250/370.09, 370.06, 370.08
See application file for complete search history.

(56) References Cited

U.S. PATENT DOCUMENTS

| | | | |
|---|---|---|---|
| 6,134,301 A | 10/2000 | Mruzek | |
| 7,129,498 B2 | 10/2006 | Hoffman | |
| 7,260,174 B2 | 8/2007 | Hoffman | |
| 7,361,881 B2 | 4/2008 | Spartiotis | |
| 7,583,790 B2 | 9/2009 | Hoffman | |
| 7,634,060 B2 | 12/2009 | Hoffman | |
| 7,696,483 B2 * | 4/2010 | Tkaczyk | G01T 1/171 250/370.06 |
| 7,697,659 B2 | 4/2010 | Hoffman | |
| 8,483,353 B2 | 7/2013 | Hoffman | |
| 2002/0018131 A1 * | 2/2002 | Kochi | H04N 3/1512 348/304 |
| 2002/0113211 A1 * | 8/2002 | Nygard | G01T 1/172 250/336.1 |
| 2007/0206721 A1 * | 9/2007 | Tkaczyk | A61B 6/032 378/19 |
| 2008/0001095 A1 | 1/2008 | Astely | |
| 2008/0099689 A1 * | 5/2008 | Nygard | G01T 1/2018 250/370.09 |
| 2008/0240341 A1 * | 10/2008 | Possin | A61B 6/032 378/19 |
| 2009/0080601 A1 | 3/2009 | Tkaczyk | |
| 2011/0155899 A1 * | 6/2011 | Dror | G01T 1/171 250/252.1 |
| 2011/0211669 A1 * | 9/2011 | Herrmann | G01T 1/249 378/19 |
| 2012/0085915 A1 * | 4/2012 | Baeumer | G01T 1/17 250/370.09 |
| 2013/0003497 A1 * | 1/2013 | Elboth | G01V 1/201 367/20 |
| 2013/0105701 A1 * | 5/2013 | Han | G01T 1/247 250/394 |
| 2014/0117247 A1 | 5/2014 | Hamlin | |
| 2014/0175299 A1 | 6/2014 | Spahn | |
| 2014/0183371 A1 * | 7/2014 | Roessl | G01T 1/241 250/370.09 |
| 2014/0284492 A1 * | 9/2014 | Han | G01T 1/247 250/394 |

FOREIGN PATENT DOCUMENTS

| | | |
|---|---|---|
| WO | 2010/055457 | 5/2010 |
| WO | 2013/003497 | 1/2013 |

OTHER PUBLICATIONS

Del Sordo, et al., "Progress in the Development of CdTe and CdZnTe Semiconductor Radiation Detectors for Astrophysical and Medical Applications", Sensors 2009, 9, 3491-3526.

* cited by examiner

HIGH ENERGY RESOLUTION/HIGH X-RAY FLUX PHOTON COUNTING DETECTOR

CROSS REFERENCE TO RELATED APPLICATIONS

This application is the U.S. National Phase application under 35 U.S.C. § 371 of International Application No. PCT/IB2016/054001, filed Jul. 4, 2016, published as WO 2017/009736 on Jan. 19, 2017, which claims the benefit of U.S. Provisional Patent Application No. 62/191,547 filed Jul. 13, 2015. These applications are hereby incorporated by reference herein.

FIELD OF THE INVENTION

The following generally relates to a photon counting detector and more particularly to a photon counter detector that is configured for both high energy (spectral) resolution and high x-ray flux imaging examinations, and is described with particular application to computed tomography (CT); however, the following is also amenable to other imaging modalities.

BACKGROUND OF THE INVENTION

A computed tomography (CT) scanner includes a rotating gantry rotatably mounted to a stationary gantry. The rotating gantry supports an X-ray tube. A detector array is located opposite the X-ray tube, across an examination region. The rotating gantry and the X-ray tube rotate around the examination region about a longitudinal or z-axis. The X-ray tube is configured to emit poly-energetic ionizing radiation that traverses the examination region and illuminates the detector array. The detector array includes a one or two dimensional array of detector pixels that detect the radiation and that generate signals indicative thereof. Each pixel is associated with a readout channel, which is used to convey a corresponding signal for further processing. A reconstructor reconstructs the processed signals, producing volumetric image data.

For spectral CT, the detector pixels have included a direct conversion photon counting detector pixel. Generally, a direct conversion photon counting detector pixel includes a direct conversion material disposed between a cathode and an anode, and a voltage is applied across the cathode and the anode. Photons illuminate the cathode, transferring energy to electrons in the direct conversion material, which creates electron/hole pairs, with the electrons drifting towards the anode. The anode, in response, produces an electrical signal. A pulse shaper processes the electrical signal and produces a pulse having peak amplitude indicative of the energy of the detected photon. A pulse discriminator compares the amplitude of the pulse with energy thresholds. For each threshold, a counter counts the number of pulses that cross the threshold. An energy-binner bins the counts in energy-ranges, thereby energy-resolving the photons. The reconstructor reconstructs the binned signals, producing energy specific volumetric image data.

A direct conversion photon counting detector pixel, generally, can handle observed X-ray flux rates up to ten million counts per second (10 Mcps) per channel. The inherent poisson nature of the X-ray photons may result in overlapping pulses (i.e., pulse pile-up) as a next photon may arrive before the processing of a current photon is complete. The probability of pile-up increases with the mean poisson rate of the impinging X-ray photon flux. When pulses overlap, their amplitudes combine so that the individual pulses may not be discernable from the combination, and the peak energy of a pulse is shifted by the amplitude contribution of the overlapping pulse such that the energy distribution of the detected photons may be erroneous, thereby reducing image quality. In conventional non-spectral CT, the X-ray flux rate can be on the order of hundreds of Mcps per channel and thus direct conversion photon counting detector pixels are not well-suited for conventional non-spectral CT applications.

An approach to reduce the X-ray flux for direct conversion photon counting detector array has been to reduce the physical size of the detector pixels. Smaller pixels reduce the rate requirements of the readout electronics and increase the rate capability per unit area (i.e. Mcps/mm$^2$ geometrically increases for a given electronics performance and smaller pixels). Unfortunately, reducing the physical size of the pixels degrades the energy resolution due to charge sharing and k-escape events to neighboring pixels. From the literature, in one configuration, a smaller pixel size is fixed at assembly and a "virtual" larger pixel size is dynamically created by combining the outputs after the pulse shaper of non-saturated smaller pixels. This configuration has included additional arbitration circuitry that determines which, if any, pixels are saturated, discards signals from saturated pixels, and combines the outputs of non-saturated pixels through a truth table and/or a switching network. Unfortunately, the additional arbitration circuitry consumes space, introduces circuit complexity, reduced count rate capability and adds to the overall cost of the detector.

SUMMARY OF THE INVENTION

Aspects described herein addresses the above-referenced problems and others.

In one aspect, an imaging system includes a detector module. The detector module includes a block of a plurality of direct conversion photon counting detector pixels and corresponding electronics with hardware for both high energy resolution imaging mode and high X-ray flux imaging mode connected with the block of the plurality of direct conversion photon counting detector pixels.

In another aspect, a method includes identifying a scanning mode for a selected imaging protocol, wherein the scanning modes includes one of a higher energy resolution mode and a higher X-ray flux mode, configuring a detector module, which is configurable for both the higher energy resolution mode and the higher X-ray flux mode, based on the identified scanning mode, performing the scan with the detector module configured for the mode of the selected imaging protocol, and processing scan data from the scan, generating volumetric image data.

In another aspect, a method commencing a scan using a detector module, which is configured for both a higher energy resolution mode and a higher X-ray flux mode, generating, simultaneously, first data for the higher energy resolution mode and second data for the higher X-ray flux mode, selecting at least one of the first data or the second data for further processing, and processing the selected at least one of the first data or the second data, generating volumetric image data.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
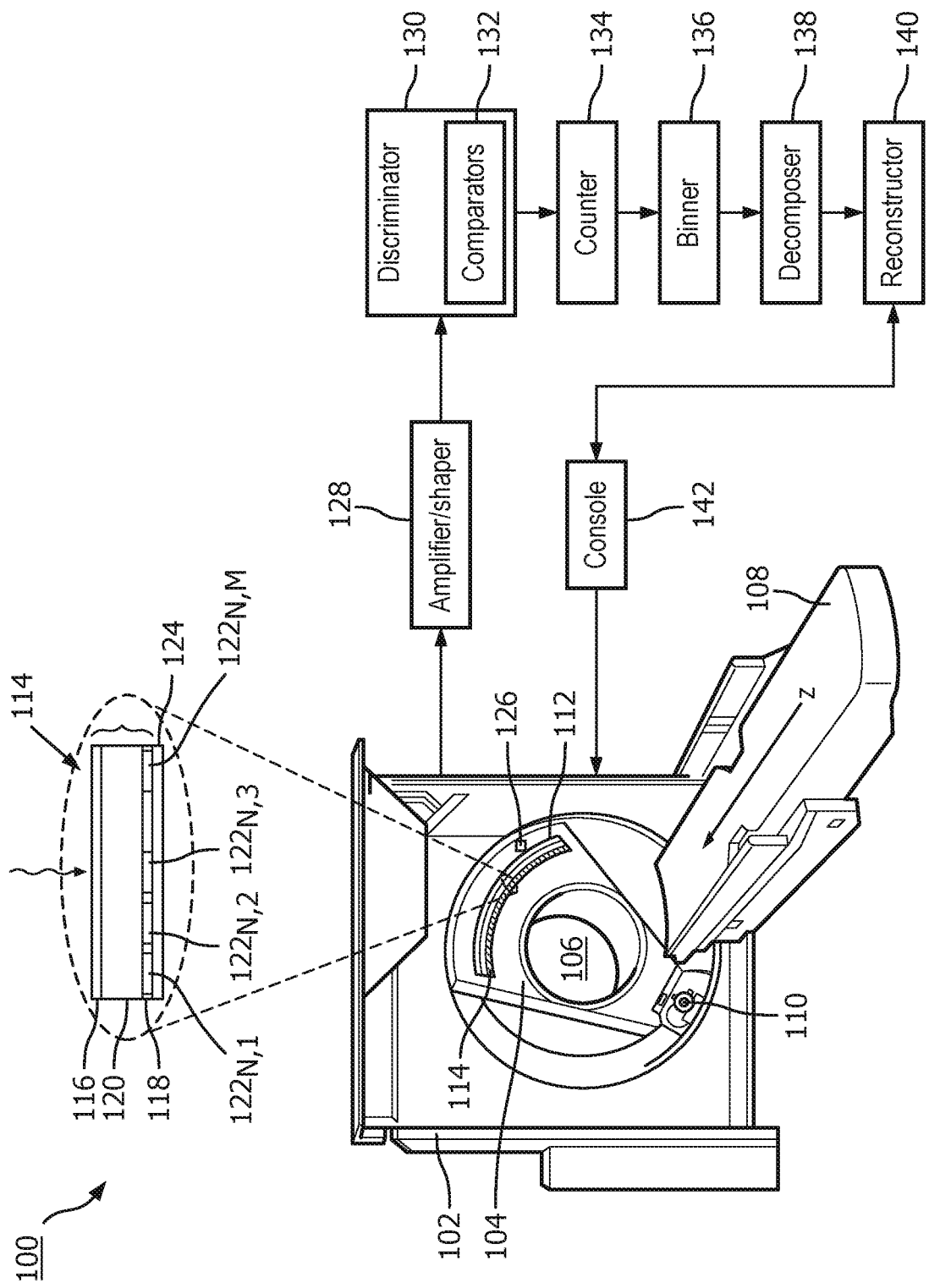
FIG. 1 schematically illustrates an example imaging system with a direct conversion photon counting detector.

Initially referring to FIG. 1, an imaging system 100 such as a computed tomography (CT) scanner is schematically illustrated. The imaging system 100 includes a stationary gantry 102 and a rotating gantry 104, which is rotatably supported by the stationary gantry 102. The rotating gantry 104 rotates around an examination region 106 about a longitudinal or z-axis. A subject support 108, such as a couch, supports an object or subject in the examination region 106. The imaging system 100 includes a radiation source 110, such as an X-ray tube, which is supported by and rotates with the rotating gantry 104 around the examination region 106 about the longitudinal or z-axis 108. The radiation source 110 emits ionizing (x-ray) radiation that traverses the examination region 106 and a portion of a subject or an object located therein.

The imaging system 100 includes a detector array 112 that subtends an angular arc opposite the examination region 106 relative to the radiation source 110. The detector array 112 includes a one or two dimensional array of photon counting detector modules 114 arranged along a transverse or x-direction. In this example, the module 114 includes a cathode layer 116, an anode layer 118, and a direct-conversion material 120 disposed there between. Suitable direct conversion material includes, but is not limited to, cadmium telluride (CdTe), cadmium zinc telluride (CZT), silicon (Si), and/or gallium arsenide (GaAs). The anode layer 118 includes individual detector pixels $122_{N,1}$, $122_{N,2}$, $122_{N,3}$, ..., $122_{N,M}$ (collectively referred to herein as pixels 122), where N and M are positive integers, which are in electrical communication with electronics 124 (e.g., an ASIC). The pixels 122 detect radiation traversing the examination region 106 and generate electrical signals indicative of an energy thereof.

Figure 2:
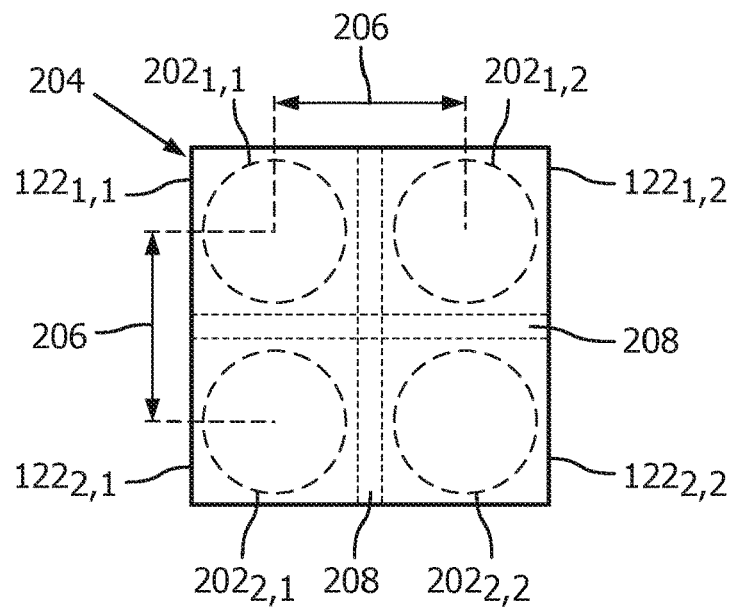
FIG. 2 schematically illustrates an example sub-portion of the direct conversion photon counting detector.

Briefly turning to FIG. 2, a sub-portion 204 of the anode layer 118 is illustrated and includes four (4) photon counting pixels $122_{1,1}$, $122_{1,2}$, $122_{2,1}$, and $122_{2,2}$ with corresponding pixel anode electrodes $202_{1,1}$, $202_{1,2}$, $202_{2,1}$ and $202_{2,2}$. In this example, the photon counting pixels electrodes $202_{1,1}$, $202_{1,2}$, $202_{2,1}$ and $202_{2,2}$ are round and isotropic. In a variation, the photon counting pixels $122_{1,1}$, $122_{1,2}$, $122_{2,1}$, and $122_{2,2}$ or electrodes $202_{1,1}$, $202_{1,2}$, $202_{2,1}$ and $202_{2,2}$ are otherwise shaped (e.g., square, rectangular, hexagonal, irregular, etc.) and/or not isotropic. In the illustrated example, a pitch 206 (e.g., a center-to-center distance between adjacent detector pixels 122) is on an order of 150 to 350 microns (μm), such as 175 μm, 250 μm, 325 μm, etc. Other pitches are also contemplated herein. A spacing 208 between adjacent detector pixels 122 is on an order of 0.10 to 75.00 microns (μm), such as 0.10, 25.00, 50.00, etc. Other spacing between pixels 122 is also contemplated herein.

Returning to FIG. 1, as described in greater detail below, the pixels 122 are grouped into a plurality of blocks of pixels, each block configured as a detector, and configured to detect for both higher energy resolution applications such as spectroscopic mode and higher x-ray flux applications such as Hounsfield Unit (HU) mode. An example block is a 2×2 block, such as the 2×2 block shown in FIG. 2. Examples of other size blocks include, but are not limited to, N=1, 2, 3, 4, ..., etc., and M=1, 2, 3, 4, ..., etc., for N=M and N≠M. As further described below, a controller 126, in one instance, configures each block through hardware for higher energy resolution and/or higher x-ray flux a priori, or before a scan is performed, e.g., based on the scan protocol, user setting, default, etc. for the scan. As such, arbitration circuitry that determines whether a pixel is saturated and how to combine signals output by pixels based on the determination is mitigated, reducing processing complexity and/or overall cost. However, the particular mode of operation can also be selected based on X-ray flux rate during scanning.

For each detector pixel 122, an amplifier/pulse shaper 128 amplifies the output electrical signal and generates a pulse (e.g., voltage, current, etc.) having a peak amplitude that is indicative of the energy of the detected radiation. A discriminator 130 includes one or more comparators 132. Each comparator 132 compares the amplitude of the pulse with one or more predetermined energy thresholds that correspond to one or more different energy ranges. The comparators 132 respectively produce output signals indicative of whether the energy of a detected photon event is above or below the threshold. A counter 134 counts, for each energy range, a number of pulses that falls within the energy range based on the comparator output signals. For example, the counter 134 increments a count value for a threshold in response to the output of the comparator 132 exceeding the corresponding threshold.

A binner 136 energy-bins or assigns the counts and hence the detected radiation to an energy window, thereby energy-resolving the detected radiation. A bin is defined for an energy range between two thresholds. The binner 136 assigns a photon event with a count for a lower threshold but not for a higher threshold to the bin defined for the energy range between the two thresholds. A decomposer 138 decomposes the energy-resolved detected radiation. For example, the decomposer 138 may decompose the energy-resolved detected radiation into a photoelectric component, a Compton scatter component, a K-edge component, and/or other basis materials or components. A reconstructor 140 reconstructs one or more of the decomposed components, producing spectral volumetric image data. Alternatively, the decomposed components are combined and reconstructed to produce non-spectral volumetric image data, and/or the spectral volumetric image data is combined to produce non-spectral volumetric image data.

A computing system serves as an operator console 142, and includes an output device such as a display and an input device such as a keyboard, mouse, and/or the like. Software resident on the console 142 allows the operator to interact with the system 100. This may include selecting an imaging acquisition protocol, selecting an imaging reconstruction protocol, initiating scanning, pausing scanning, etc. In one instance, the imaging acquisition protocol and/or the imaging reconstruction protocol includes a parameter that indicates the mode (higher energy resolution and/or higher X-ray flux) for the detector module 114 for a scan to be performed. In this instance, the console 142 transmits, conveys, etc. a mode signal to the controller 126, which programs the blocks of pixels 122 for the particular mode of operation based on the mode signal.

Figure 3:
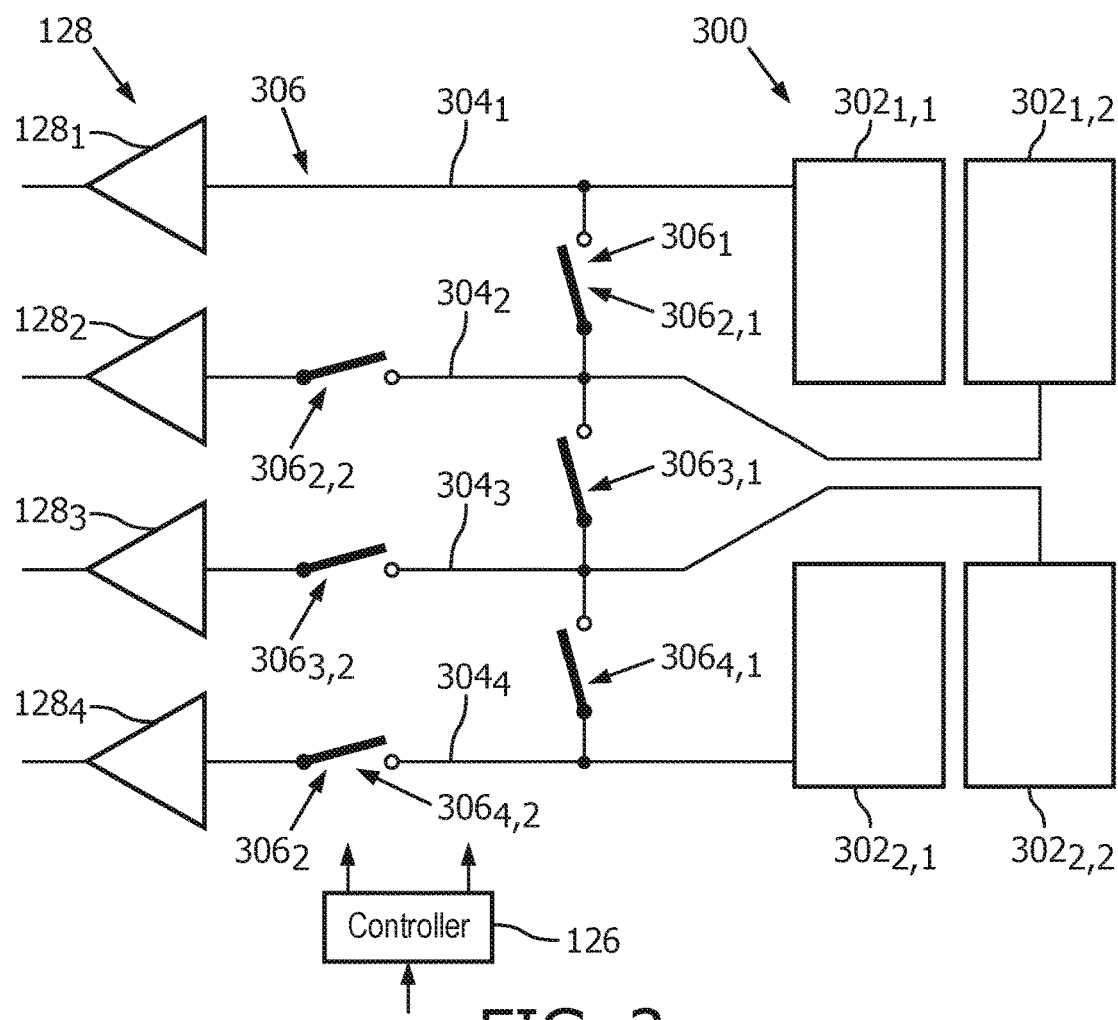
FIG. 3 schematically illustrates example electronics of the direct conversion photon counting detector of an embodiment in the current invention.

FIG. 3 illustrates a non-limiting example of the electronics 124 for a pixel block 300 that includes the pixels $122_{1,1}$, $122_{1,2}$, $122_{2,1}$ and $122_{2,2}$ shown in FIG. 2. It is to be understood that other blocks (e.g., larger, smaller, non-square, etc.) are contemplated herein.

In this example, the electronics 124 include electrically conductive electrodes $302_{1,1}$, $302_{1,2}$, $302_{2,1}$ and $302_{2,2}$, respectively corresponding to the pixels $122_{1,1}$, $122_{1,2}$, $122_{2,1}$ and $122_{2,2}$ and in electrical communication with the pixel anode electrodes $202_{1,1}$, $202_{1,2}$, $202_{2,1}$ and $202_{2,2}$. An output of the electrode $302_{1,1}$ is routed through a first electrically conductive channel $304_1$ (e.g., a trace, wire, etc.) to a first sub-amplifier/shaper $128_1$ of the amplifier/pulse shaper 128 (FIG. 1). An output of the electrode $302_{1,2}$ is routed through a second electrically conductive channel $304_2$. The illustrated second channel $304_2$ includes a first switch $306_{2,1}$ and a second switch $306_{2,2}$. The first switch $306_{2,1}$ alternately electrically connects and disconnects the channel $304_2$ to the first channel $304_1$. The second switch $306_{2,2}$ alternately electrically connects or disconnects the channel $304_2$ to a second sub-amplifier/shaper $128_2$.

An output of the electrode $302_{2,1}$ is routed through a third electrically conductive channel $304_3$, which includes a first switch $306_{3,1}$ and a second switch $306_{3,2}$. The first switch $306_{3,1}$ alternately electrically connects and disconnects the channel $304_3$ (through the first switch $306_{2,1}$) to the first channel $304_1$. The second switch $306_{3,2}$ alternately electrically connects and disconnects the channel $304_3$ to a third sub-amplifier/shaper $128_3$. An output of the electrode $302_{2,2}$ is routed through a fourth electrically conductive channel $304_4$, which includes a first switch $306_{4,1}$ and a second switch $306_{4,2}$. The first switch $306_{4,1}$ alternately electrically connects or disconnects the channel $304_4$ (through the first switches $306_{2,1}$ and $306_{3,1}$) to the first channel $304_1$. The second switch $306_{4,2}$ alternately electrically connects or disconnects the channel $304_4$ to a fourth sub-amplifier/shaper $128_4$.

The first switches $306_{2,1}$, $306_{3,1}$ and $306_{4,1}$ are referred to collectively herein as first switches $306_1$. The second switches $306_{2,2}$, $306_{3,2}$ and $306_{4,2}$ are referred to collectively herein as second switches $306_2$. The first switches $306_1$ and the second switches $306_2$ are referred to collectively herein as switches 306. The controller 126 is configured to control the switches 306. Such control includes "closing" and "opening" the switches 306, which electrically connects or disconnects the first switches $306_1$ and the second switches $306_2$ respectively with the channels $304_2$-$304_4$ and the sub-amplifiers/shapers $128_1$-$128_4$ as described herein. In the illustrated example, the controller 126 actuates, before a scan, the switches 306 in response to the mode signal, which, as described herein, is indicative of the mode of operation (higher energy resolution or higher x-ray flux) for a scanned to be performed.

In operation, prior to a scan of a subject, the controller 126 receives the mode signal. In one instance, the mode signal is generated during the scan planning phase, such as in connection with a user interacting with a console scan planning application executing on the console 142. The mode signal represents a command which causes the controller 126 to "close" or "open" the switches 306. For example, for a scan where higher energy resolution is required and the X-ray flux will not saturate the detector pixels 122, the mode signal causes the controller 126 to close the first switches $306_1$ and open the second switches $306_2$. In this configuration, the outputs of all of the pixels $302_{1,1}$, $302_{1,2}$, $302_{2,1}$ and $302_{2,2}$ are routed to the channel $304_1$ and to the sub-amplifier/shaper $128_1$. For a higher X-ray flux scan, the mode signal causes the controller 126 to open the first switches $306_1$ and close the second switches $306_2$. In this configuration, the output of each of the pixels $302_{1,1}$, $302_{1,2}$, $302_{2,1}$ is routed to a respective different one of the sub-amplifiers/shapers 128.

With this configuration, for a pitch of 250 µm and N=M=2, the acquisition electronics is configurable a priori (i.e., before a scan) between four (4) individual 250×250 µm pixels and a single 500×500 µm larger pixel. As such, the block 300 is configurable between higher energy resolution larger pixel and higher X-ray flux smaller pixel scanning configurations. For non-spectral scans, the individual pixel outputs are individually conveyed to respective discriminators 130 with a single comparator 132 and a threshold set in accordance with, e.g., the noise floor to distinguish between only noise and signal and/or otherwise. For a spectral scan, the combined output of the pixels 122 is processed by the sub-amplifier/shaper $128_1$ and then conveyed to a discriminator 130 with a bank of three (3) or more comparators 132, such as 3, 4, 5, . . . , 10, . . . 100, etc. comparators, each with a different energy threshold for energy separation.

It is to be understood that the geometry and/or spatial orientation of the physical components described in connection with FIG. 2 are shown for explanatory purposes and are not limiting. Furthermore, although the electrode $302_{1,1}$ is shown always connected to the sub-amplifier/shaper $128_1$ (i.e., the channel $304_1$ does not include any switches 306) with the outputs of the other electrodes 302 either connectable to the channel $304_1$, in another example, a different one of the electrodes 302 is always connected to a sub-amplifier/shaper connected to a discriminator 130 with a bank of comparators with a different energy threshold for energy separation. In any instance, the block 300 is configurable for both higher x-ray flux and higher energy resolution, and can be placed in a particular mode prior to scanning. This configuration also allows for a constant data rate, independent of the mode.

Although the above describes configuring the operating mode for the block 300 a priori, it is to be appreciated that in another instance the operating mode is automatically selected depending on the incoming X-ray flux incident on the pixels 122. In this instance, the controller 126 can employ switch criteria that can be implemented based on flux information.

Figure 4:
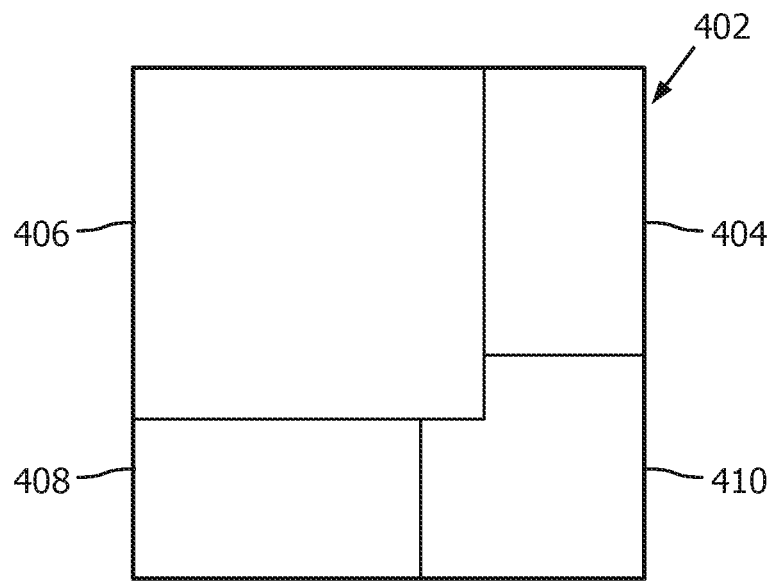
FIG. 4 illustrates example electrodes of the electronics of an embodiment in the current invention.
Figure 5:
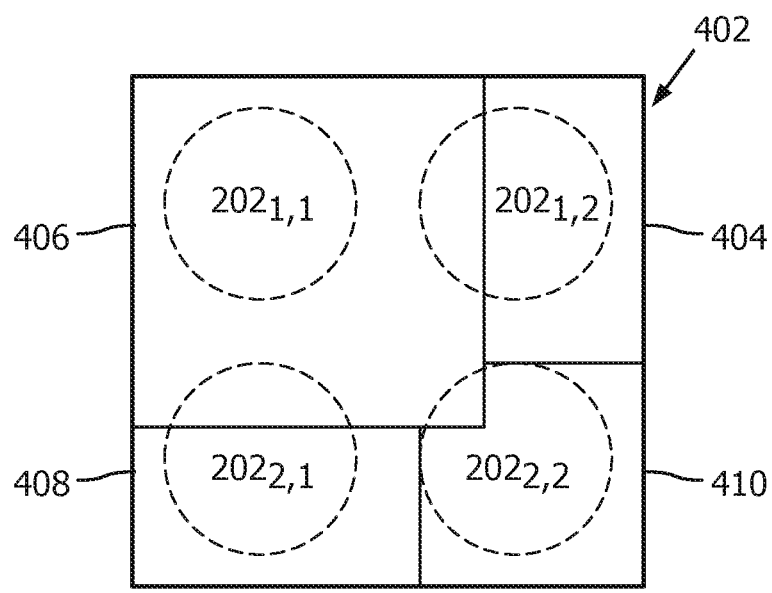
FIG. 5 illustrates an example of the electrodes in connection with direct conversion photon counting detector pixel pads of FIG. 4.
Figure 6:
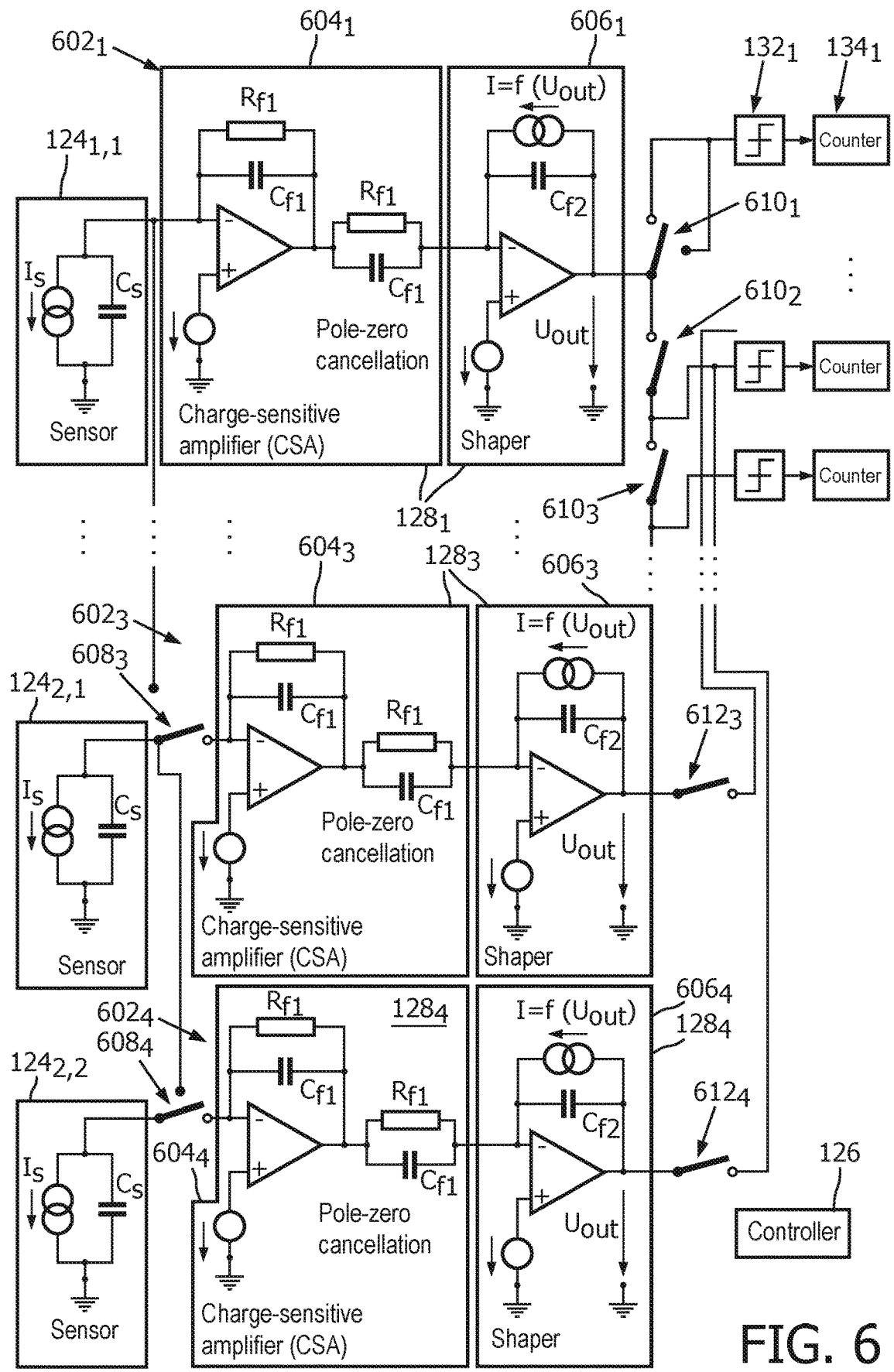
FIG. 6 schematically illustrates another example of electronics of the direct conversion photon counting detector.

FIGS. 4, 5, and 6 illustrate another example of the electronics 124 for the pixel block 300 of FIG. 3 that includes the pixels $122_{1,1}$, $122_{1,2}$, $122_{2,1}$ and $122_{2,2}$ shown in FIG. 2. Likewise, other blocks (e.g., larger, smaller, non-square, etc.) are also contemplated for this example.

FIG. 4 shows a sub-portion 402 of the electronics 124 with four (4) regions 404, 406, 408 and 410, which correspond to individual pixel processing. FIG. 5 shows the sub-portion 402 superimposed over the sub-portion 204 of FIG. 2, showing the electrically conductive paths between the electrodes 404, 406, 408 and 410 and the pixel anode pads $202_{1,1}$, $202_{1,2}$, $202_{2,1}$ and $202_{2,2}$. In this example, the electrode 406 has a larger area than the electrodes 404, 408 and 410, which all have equal areas. With this configuration, the block 300 is configurable, e.g., before a scan, between a mode in which the electrode 404 routes the signals from all of the pixel anode pads $202_{1,1}$, $202_{1,2}$, $202_{2,1}$ and $202_{2,2}$ or a mode in which each of the electrodes 404, 406, 408 and 410 routes a signal from a respective one of the pixel anode pads $202_{1,1}$, $202_{1,2}$, $202_{2,1}$ and $202_{2,2}$. With this configuration electrode 406 may have extra structures for the extra energy thresholds that may be used in energy resolution mode.

In FIG. 6, a processing chain $602_1$ for the electrode 404 includes a sub-amplifier/shaper $128_1$ with an amplifier $604_1$ and a shaper $606_1$ configured for a first pulse duration having a single value in a range from, e.g., ten (10) nanoseconds (ns) at full width half maximum (FWHM) to thirty (30) ns FWHM, such as 18, 20, 25, etc. ns FWHM. Processing chains $602_2$ (not visible due to page size limitations), $602_3$ and $602_4$ for the electrodes 406, 408 and 410 includes sub-amplifiers/shapers $128_2$ (not visible due to page size limitations), $128_3$, and $128_4$ with amplifiers $604_2$ (not visible due to page size limitations), $604_3$, and $604_4$ and shaper $606_2$ (not visible due to page size limitations), $606_3$, and $606_4$ with a second different pulse duration having a single value in a range from, e.g., ten (30) ns at full FWHM to thirty (50) ns FWHM, such as 35, 40, 48, etc. ns FWHM. The shaper $606_1$ of the first processing chain $602_1$ may also be configured for the second different pulse duration and/or other pulse duration.

The processing chains $602_1$, $602_2$, $602_3$ and $602_4$ share a set $132_1$ of the comparators 132 and a set $134_1$ of the counters 134. The processing chain $602_1$ is configured for high energy resolution scanning mode. In this mode, the controller 126 controls switches $608_2$ (not visible due to page size limitations), $608_3$ and $608_4$ so that the signals from the pixel anode pads $202_{1,1}$, $202_{1,2}$, $202_{2,1}$ and $202_{2,2}$ are routed to the processing chains $602_1$. The controller 126 also controls switches $610_1$, $610_2$, $610_3$, . . . and the switches $612_2$ (not visible due to page size limitations), $612_3$, and $612_3$ so that only the output of the shaper $606_1$ is processed by the set $132_1$ of comparators 132 and the set of counters $134_1$. In this mode, each comparator/counter pair 132/134 corresponds to a different energy threshold for energy separation of the signal. In this mode, the processing chains $602_2$, $602_3$ and $602_4$ are idle and/or transitioned into a lower power state such as off, a sleep state, a hibernate state, etc., and do not utilize the set $132_1$ of comparators 132 and the set of counters $134_1$.

The processing chains $602_1$, $602_2$, $602_3$ and $602_4$ are configured for high X-ray flux scanning mode. In this mode, the controller 126 control switches $608_2$, $608_3$ and $608_4$ so that respective signals from respective pixel anode pads $202_{1,1}$, $202_{1,2}$, $202_{2,1}$ and $202_{2,2}$ are routed through respective processing chains $602_1$, $602_2$, $602_3$ and $602_4$. Furthermore, the controller 126 also the controls switches $610_1$, $610_2$, $610_3$, . . . and the switches $612_2$, $612_3$, and $612_3$ so that the outputs of the shapers $606_1$, $606_2$, $606_3$, and $606_4$ are processed respectively by a single different comparator/counter pair 132/134 of the set $132_1$ of comparators and the set of counters $134_1$. In this mode, each comparator/counter pair 132/134 has a same threshold, e.g., corresponding to the noise floor or other predetermined threshold value.

Figure 7:
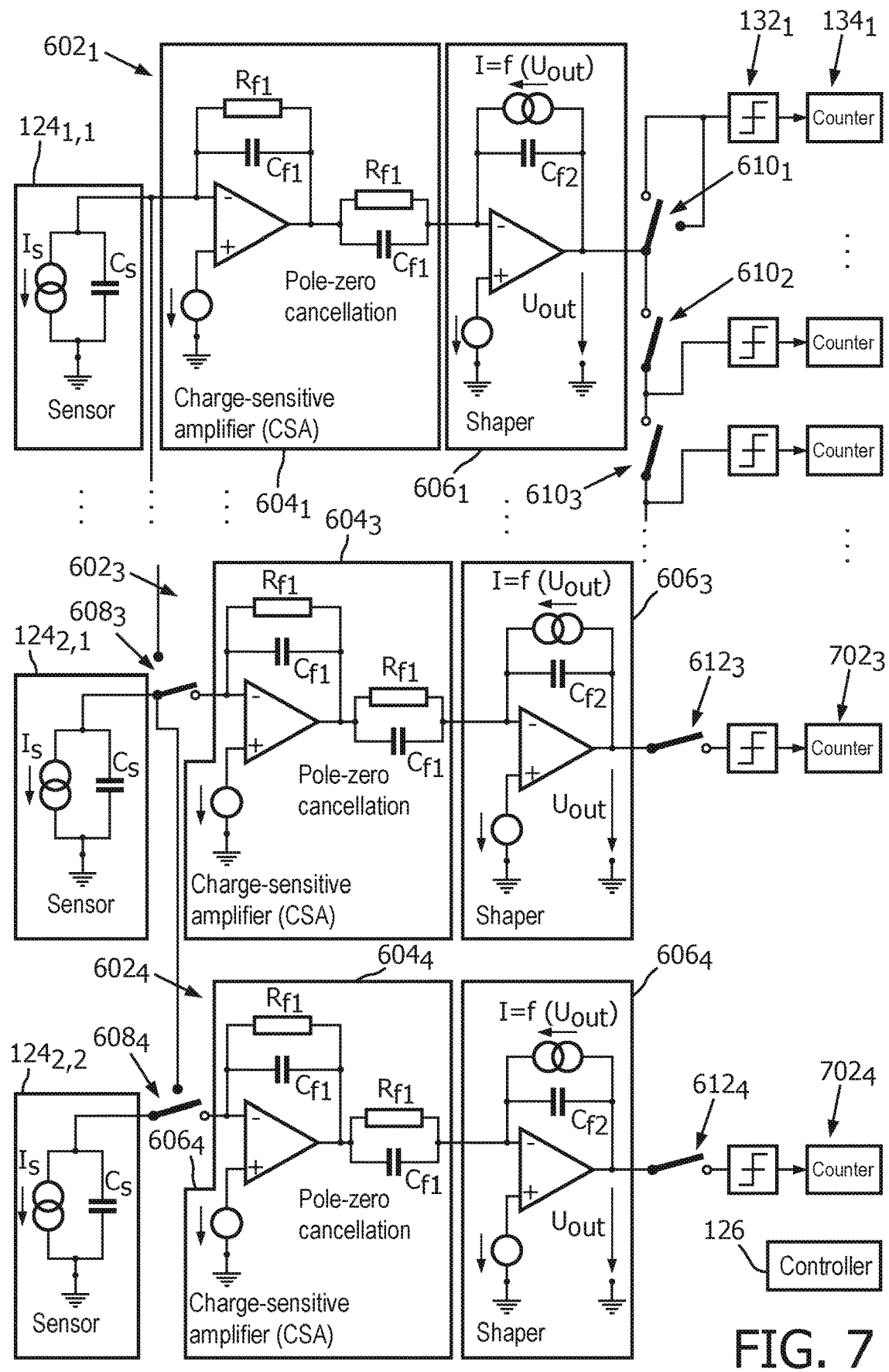
FIG. 7 schematically illustrates a variation of FIG. 6.

FIG. 7 shows a variation of FIG. 6 in which each of the processing chains $602_1$, $602_2$, $602_3$ and $602_4$ has its own set of comparator/counter pairs $702_2$ (not visible due to page size limitations) $702_3$, and $702_4$. For example, in this example, the processing chains $602_1$ still employs the set $132_1$ of comparators and the set of counters $134_1$, using a single comparator/counter pair 132/134 in high x-ray flux mode and using more than a single one of the comparator/counter pairs 132/134 in high energy resolution mode. However, each of the processing chains $602_2$, $602_3$ and $602_4$ employs its own comparator/counter pair $702_2$, $702_3$, and $702_3$ in high x-ray flux mode and no comparator/counter pair in high energy resolution mode, when the chains $602_2$, $602_3$ and $602_4$ may be off or in a lower power mode.

The approximate power requirement for a shaper is proportional to a square of an intended bandwidth (or inversely proportional to the square of the pulsed duration). As such, in higher x-ray flux mode with a pulse duration of 30 ns and pixels of 250 µm pitch, the required power per pixel is smaller, by a factor $(3/2)^2=2.25$, than the power required for the 500 µm pixel at 20 ns pulse duration. Per $mm^2$, the high x-ray flux mode will then have a $4/2.25=1.8$ times higher power consumption.

Although the above describes configuring the operating mode for the block 300 a priori, it is to be appreciated that in another instance the operating mode is automatically selected depending on the incoming flux. In this instance, the controller 126 can employ switch criteria that can be implemented based on flux information. This information can be obtained, e.g., by using a mean voltage at the output of the amplifier (which is indicative of the rate), or a count density of the lowest threshold in high energy resolution mode (or any threshold in high x-ray flux mode), or other approach. This will also include automatic adjustment of the threshold to either multiple energy bins (high energy resolution mode) or fixed threshold counting (high x-ray flux mode). The currently employed mode can be transmitted in the image data and/or otherwise.

Figure 8:
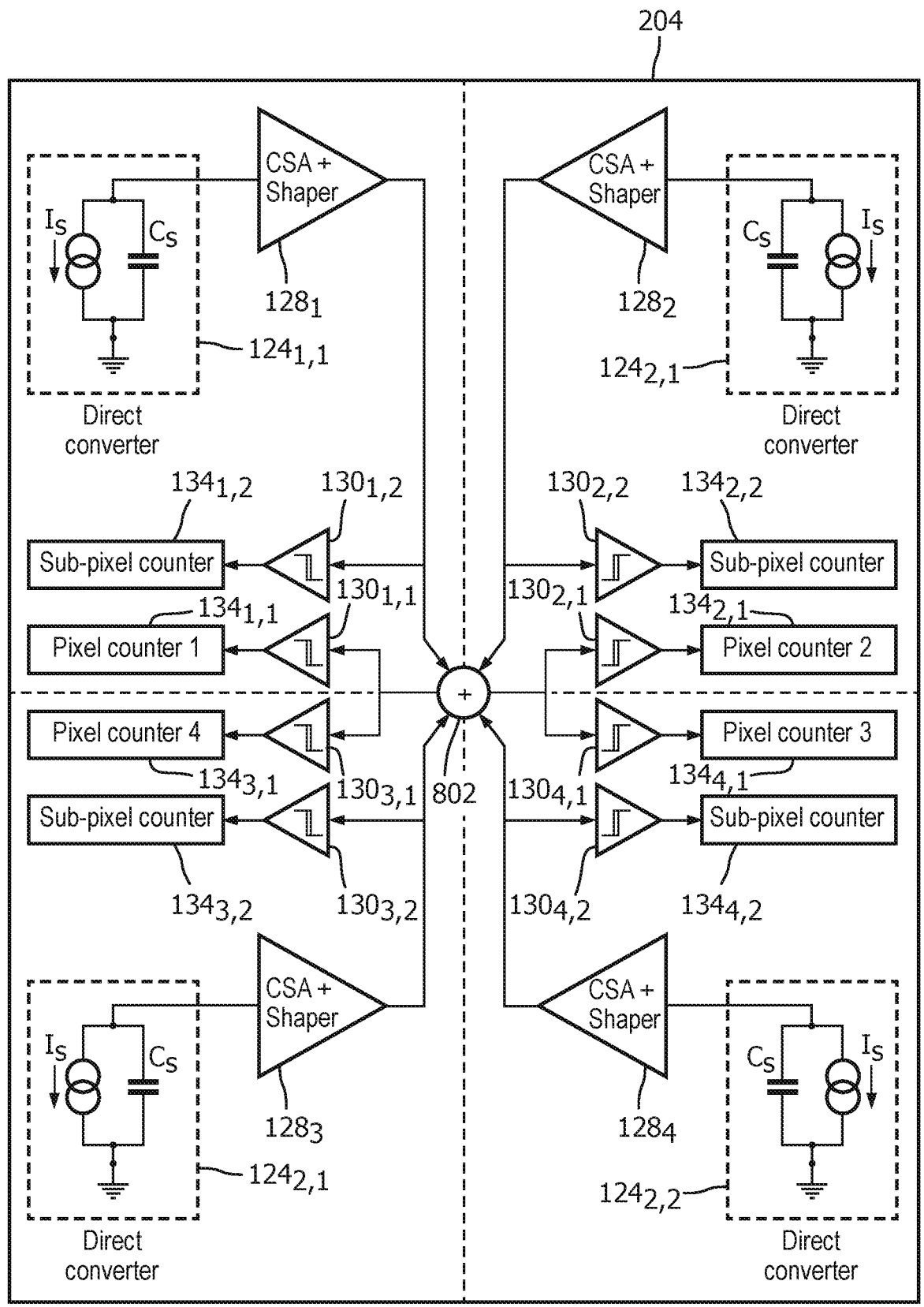
FIG. 8 schematically illustrates another example of electronics of the direct conversion photon counting detector.

FIG. 8 illustrates another example of the detector module electronics 124 for the pixel block 300 of FIG. 3 that includes the pixels $122_{1,1}$, $122_{1,2}$, $122_{2,1}$ and $122_{2,2}$ shown in FIG. 2. Likewise, other blocks (e.g., larger, smaller, non-square, etc.) are also contemplated for this example.

In this example, a summer 802 sums charge from the sub-amplifier/shapers $128_1$ . . . $128_4$ of the pixels $122_{1,1}$, $122_{1,2}$, $122_{2,1}$ and $122_{2,2}$ to generate spectral information for the aggregate of the block 300 of the pixels 122. The resulting pulse height is equivalent to an output from a single shaper from the same equivalent area, i.e. adding the charge (voltage) of the pixels 122 is equivalent in terms of height and spectral quality (same k-escape fraction, charge sharing, . . . ) as the equivalent conventional single pixel readout of the same 2×2 area of the block 300.

Each of the pixels $122_{1,1}$, $122_{1,2}$, $122_{2,1}$ and $122_{2,2}$ has a first discriminator $130_{1,1}$, $130_{2,1}$, $130_{3,1}$ and $130_{4,1}$ and a corresponding first counter $134_{1,1}$, $134_{2,1}$, $134_{3,1}$ and $134_{4,1}$. Each of the first discriminators $130_{1,1}$, $130_{2,1}$, $130_{3,1}$ and $130_{4,1}$ has a different energy threshold corresponding to a different energy level of interest. The output of the summer 802 is routed to each of the first discriminators $130_{1,1}$, $130_{2,1}$, $130_{3,1}$ and $130_{4,1}$. The output of the first discriminators $130_{1,1}$, $130_{2,1}$, $130_{3,1}$ and $130_{4,1}$ is routed to a respective one of the first counter $134_{1,1}$, $134_{2,1}$, $134_{3,1}$ and $134_{4,1}$. The output of the first counters $134_{1,1}$, $134_{2,1}$, $134_{3,1}$ and $134_{4,1}$, collectively, provide multi-bin spectral information from the equivalent charge forming of a pixel size corresponding to the pixel block 300 or 2×2 pixels.

Each of the pixels $122_{1,1}$, $122_{1,2}$, $122_{2,1}$ and $122_{2,2}$ also has a second discriminator $130_{1,2}$, $130_{2,2}$, $130_{3,2}$ and $130_{4,2}$ and a corresponding second counter $134_{1,2}$, $134_{2,2}$, $134_{3,2}$ and $134_{4,2}$. Each of the second discriminator $130_{1,2}$, $130_{2,2}$, $130_{3,2}$ and $130_{4,2}$ has a same energy threshold corresponding to a same energy level of interest, e.g., an energy level of the lowest threshold of the first discriminators $130_{1,1}$, $130_{2,1}$, $130_{3,1}$ and $130_{4,1}$ and/or otherwise. The output of each the sub-amplifier/shapers $128_1$, $128_2$, $128_3$ and $128_4$ is routed to a respective one of the second discriminators $130_{1,2}$, $130_{2,2}$, $130_{3,2}$ and $130_{4,2}$. The output of the second discriminators $130_{1,2}$, $130_{2,2}$, $130_{3,2}$ and $130_{4,2}$ is routed to a respective one of the second counters $134_{1,2}$, $134_{2,2}$, $134_{3,2}$ and $134_{4,2}$. The output of each of the second counters $134_{1,2}$, $134_{2,2}$, $134_{3,2}$ and $134_{4,2}$ provides rate information for the individual pixels 122.

In this example, all of the pixels $122_{1,1}$, $122_{1,2}$, $122_{2,1}$ and $122_{2,2}$ are associated with two channels that provide two sets of information simultaneously: a spectrally resolving channel at a larger pixel area (an aggregate of the pixels 122) size well suited for energy resolution; and a counting channel for the individual pixels 122. In one instance, the use of one or the other for imaging depends on the imaging requirements. Since both are available at all times, a decision on which information is best for imaging can be made before, during and/or after scanning. The signal-to-noise ratio of the energy-resolving channel can serve as indication as to whether the degradation of imaging performance requires resorting to the information provided at a sub-pixel level. Generally, this example mitigates the charge-sharing (and k-escape) shortcomings of small pixels by already performing hardwired in-pixel charge summing.

In a variation, each of the second discriminators $130_{1,2}$, $130_{2,2}$, $130_{3,2}$ and $130_{4,2}$ may be associated with only a single counter, which can be triggered by any of the second discriminators $130_{1,2}$, $130_{2,2}$, $130_{3,2}$ and $130_{4,2}$. In this variation, the controller 126 controls the counter to avoid racing conditions in the triggering mechanism of the counter. In another variation, all of the pixels $122_{1,1}$, $122_{1,2}$, $122_{2,1}$ and $122_{2,2}$ may utilize a same set of counters. In this variation, the controller 126 controls the counter to represent the spectral information of the energy bins, or the rate of each individual pixel, for example, based on an operating point of the detector (e.g., the incoming flux). It is to be understood that a number of thresholds and/or an arrangement and/or location in the pixels is not limited by FIG. 8. In yet another variation, the output of the second counters $134_{1,2}$, $134_{2,2}$, $134_{3,2}$ and $134_{4,2}$ can be transmitted via 1×14 bit words, instead of 4×12 bit words, which is similar to having one single counter while mitigating racing conditions. Other word lengths are contemplated herein.

In another variation, the controller 126 (FIG. 1) includes logic that determines a flux of the detected radiation. The controller 126, in response to the flux of the detected radiation being within the rate capabilities of block 300, routes the output of the first counters $134_{1,1}$, $134_{2,1}$, $134_{3,1}$ and $134_{4,1}$ for further processing. The controller 126, in response to the flux of the detected radiation surpassing the rate capabilities of block 300, routes the output of the second counters $134_{1,1}$, $134_{2,1}$, $134_{3,1}$ and $134_{4,1}$ for further processing. Each of the second discriminators $130_{2,1}$, $130_{2,2}$, $130_{3,2}$ and $130_{4,2}$ is associated with a pixel area ¼ a size of the 2×2 pixel block. As such, a rate of the second discriminators $130_{2,1}$, $130_{2,2}$, $130_{3,2}$ and $130_{4,2}$ can be at least a factor of four (4) higher that of the first discriminators $130_{1,1}$, $130_{2,1}$, $130_{3,1}$ and $130_{4,1}$.

Figure 9:
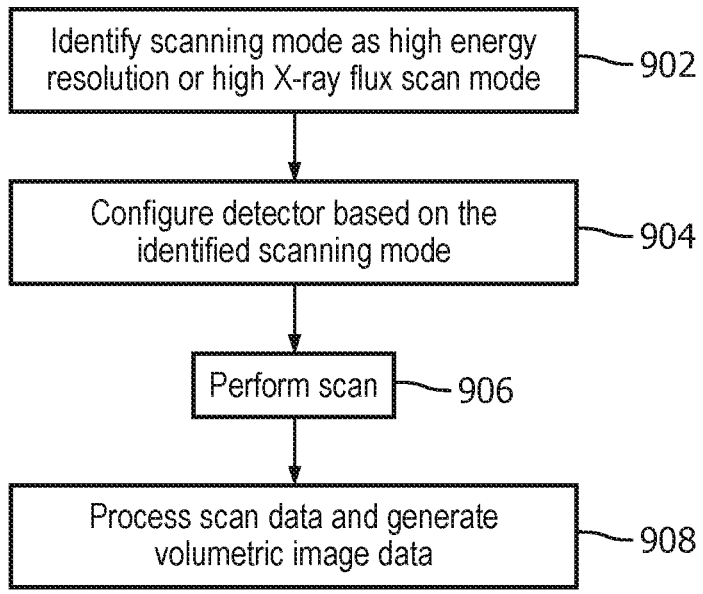
FIG. 9 illustrates an example method in accordance with an embodiment described herein.

FIG. 9 illustrates a method in accordance with an embodiment herein.

It is to be appreciated that the ordering of the acts in the methods described herein is not limiting. As such, other orderings are contemplated herein. In addition, one or more acts may be omitted and/or one or more additional acts may be included.

At 902, a scanning mode for a selected imaging protocol is identified. As described herein, optional scanning modes include higher energy resolution mode and higher X-ray flux mode.

At 904, a detector module, which is configured for both the higher energy resolution mode and the higher X-ray flux mode, is configured for the mode of the selected imaging protocol.

At 906, the scan is performed with the detector module configured for the mode of the selected imaging protocol.

At 908, scan data from the scan is processed, generating volumetric image data of the scanned subject or object.

Figure 10:
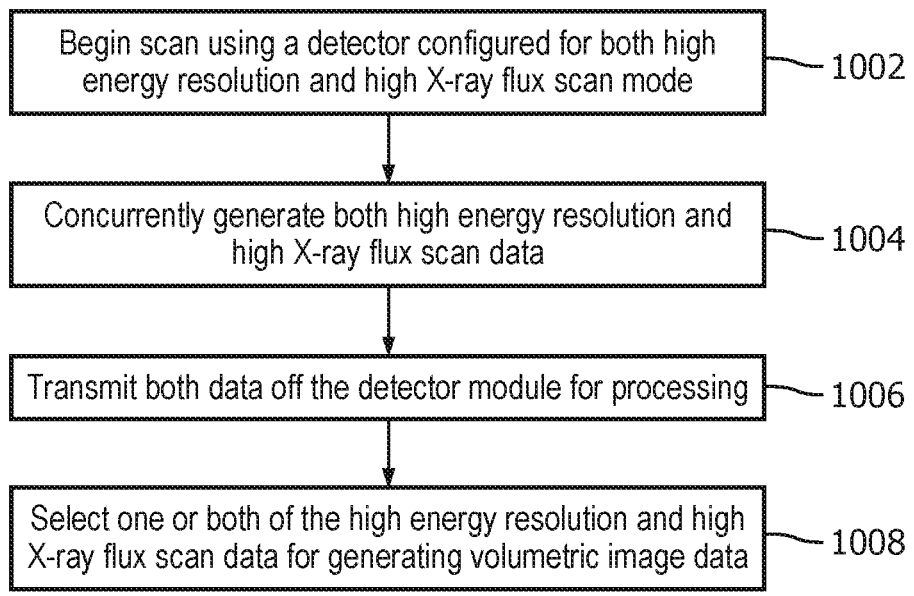
FIG. 10 illustrates another example method in accordance with an embodiment described herein.

FIG. 10 illustrates a method in accordance with an embodiment herein.

It is to be appreciated that the ordering of the acts in the methods described herein is not limiting. As such, other orderings are contemplated herein. In addition, one or more acts may be omitted and/or one or more additional acts may be included.

At 1002, a scan of a subject or object using a detector module, which is configured for both a higher energy resolution mode and a higher X-ray flux mode, is performed.

At 1004, first data for the higher energy resolution mode and second data for the higher X-ray flux mode are concurrently generated.

At 1006, the first and second data are transmitted off the detector module for processing. Optionally, only a single one of the first and second data is transmitted, for example, based on the X-ray flux rate.

At 1008, select one or both of the first and second data for generating volumetric image data. Where only one of the first or second data is selected, criteria such as X-ray flux rate, imaging protocol, etc. can be used to make the determination.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An imaging system, comprising:
   a detector, including:
     a block of direct conversion photon counting detector pixels;
     corresponding electronics with hardware for both a high energy resolution imaging mode and a high X-ray flux imaging mode connected with the block of direct conversion photon counting detector pixels;
     a first pulse shaper configured to generate a pulse signal, wherein the first pulse shaper is configured to operate at a first speed;
     a plurality of second pulse shapers configured to operate at a second speed, wherein the first speed of the first pulse shaper is higher than the second speed of the plurality of second pulse shapers; and
     a plurality of switches configured to route signals from all of the direct conversion photon counting detector pixels in the block to the first pulse shaper in response to the detector being in the high energy resolution imaging mode.

2. The imaging system of claim 1, further comprising:
   a controller configured to configure the detector for one of high energy resolution imaging or high X-ray flux imaging.

3. The imaging system of claim 2, wherein the plurality of switches are configured to route a signal from each of the direct conversion photon counting detector pixels to a different one of the plurality of second pulse shapers in response to the detector being in the high X-ray flux imaging mode.

4. The imaging system of claim 2, further comprising:
a first set of two or more comparators and counters configured to process an output of the first pulse shaper, each comparator having a different energy threshold level; and
a second set of individual comparator/counter pairs each configured to process an output of a respective one of the plurality of second pulse shapers, each comparator having a same energy threshold level.

5. The imaging system of claim 2, further comprising:
a single set of two or more comparators and counters configured to alternately process an output of the first pulse shaper, wherein each of the comparators has a different energy threshold level, and process individual outputs of the plurality of second pulse shapers with respective different comparators and counters of the set of two or more comparators and counters, wherein each of the comparators has a same energy threshold level.

6. The imaging system of claim 1, further comprising:
a controller for configuring the detector for at least one of the high energy resolution imaging or the high X-ray flux imaging based on an input, wherein the controller is configured to determine an X-ray flux rate during scanning, wherein the input is indicative of the determined X-ray flux rate, and
two comparator/counter pairs for each of the direct conversion photon counting detector pixels, including a first pair for processing a signal from a single direct conversion photon counting detector pixel and a second pair for processing a summation of signals from all the direct conversion photon counting detector pixels, wherein the first and second pair concurrently process respective signals.

7. The imaging system of claim 6, wherein the each of the first pairs has a different energy threshold, and each of the second pairs has a same energy threshold.

8. The imaging system of claim 6, wherein at least two of the direct conversion photon counting detector pixels share a counter.

9. The imaging system of claim 1, further comprising:
a controller for configuring the detector for at least one of the high energy resolution imaging or the high X-ray flux imaging based on an input, wherein the input is indicative of an imaging protocol for a scan, and the controller configures the detector for the high energy resolution imaging or the high X-ray flux imaging before the scan.

10. The imaging system of claim 1, wherein the detector includes electronics for concurrent high energy resolution imaging and high X-ray flux imaging, and
wherein the imaging system further comprises a single comparator/counter pair for each of the direct conversion photon counting detector pixels configured for both the high energy resolution imaging mode and the high X-ray flux imaging mode.

11. The imaging system of claim 1, wherein the controller is configured to determine an X-ray flux rate during scanning, wherein the input is indicative of the determined X-ray flux rate.

12. The imaging system of claim 1, wherein the corresponding include electrodes a plurality of conductive electrodes that are configured to receive the signals from the direct conversion photon counting detector pixels, respectively,
the plurality of switches includes first and second switches, and the plurality of the conductive electrodes includes first and second conductive electrodes,
the first switch is disposed electrically between the first pulse shaper and the first conductive electrode, and the second switch is disposed electrically between the first pulse shaper and the second conductive electrode,
the first conductive electrode is electrically connected to one second pulse shaper of the plurality of second pulse shapers, in a period in which the first switch interrupts an electrical connection between the first pulse shaper and the first conductive electrode, and
the second conductive electrode is electrically connected to another second pulse shaper of the plurality of second pulse shapers, in a period in which the second switch interrupts an electrical connection between the first pulse shaper and the second conductive electrode.

13. The imaging system of claim 1, wherein the pulse signal generated by the first pulse shaper derives from the signals from all of the direct conversion photon counting detector pixels.

14. A method, comprising:
identifying a scanning mode for a selected imaging protocol, wherein the scanning modes includes one of a high energy resolution mode and a high X-ray flux mode;
configuring a detector, which is configurable for both the high energy resolution mode and the high X-ray flux mode, based on the identified scanning mode;
performing the scan with the detector configured for the mode of the selected imaging protocol;
processing output signals from all detector pixels in a block with a first pulse shaper in response to configuring the detector for the higher energy resolution mode, the processing of the output signals including generating with the first pulse shaper a pulse signal, wherein the first pulse shaper is operating at a first speed;
processing the output signals from the detector pixels respectively with a plurality of second pulse shapers operating at a second speed in response to configuring the detector for the high X-ray flux resolution mode, wherein the first speed of the first pulse shaper is higher than the second speed of the plurality of second pulse shapers; and
processing scan data from the scan, generating volumetric image data.

15. The method of claim 14, further comprising:
processing the output of the first pulse shaper and the output of the different pulse shapers with a same set of comparators/counters.

16. The method of claim 14, further comprising:
processing the output of the first pulse shaper and the output of the different pulse shapers with different sets of comparators/counters.

17. The method of claim 14, further comprising:
configuring the detector for the high energy resolution mode or the high X-ray flux mode prior to performing the scan.

18. A method, comprising:
commencing a scan using a detector, which is configured for both a high energy resolution mode and a high X-ray flux mode;
generating, simultaneously, first data for the high energy resolution mode and second data for the high X-ray flux mode;
selecting at least one of the first data or the second data for further processing;
processing output signals from all detector pixels in a block with a first pulse shaper at a first speed in response to selecting the first data, the processing of the output signals including generating with the first pulse shaper a pulse signal; and
processing the output signals from all of the detector pixels in the block respectively with different pulse shapers at a second speed that is slower than the first speed in response to selecting the second data; and
processing the selected at least one of the first data or the second data, generating volumetric image data.

19. The method of claim 18, further comprising:
processing, concurrently, output signals from a plurality of detector pixels with first comparators and first counters, and a summation of the signals from the first pulse shaper with respective second comparators and second counters.

20. The method of claim 19, further comprising:
utilizing a same energy threshold for the first comparators.

21. The method of claim 19, further comprising:
utilizing a different energy threshold for the second comparators.

22. The method of claim 19, further comprising:
processing the output signals from the detector pixels with a same set of shared comparators/counters.

23. The method of claim 19, further comprising:
processing the output signals from the plurality of detector pixels and the summation with a same set of shared comparators/counters.

* * * * *